United States Patent Office 3,570,163
Patented Mar. 16, 1971

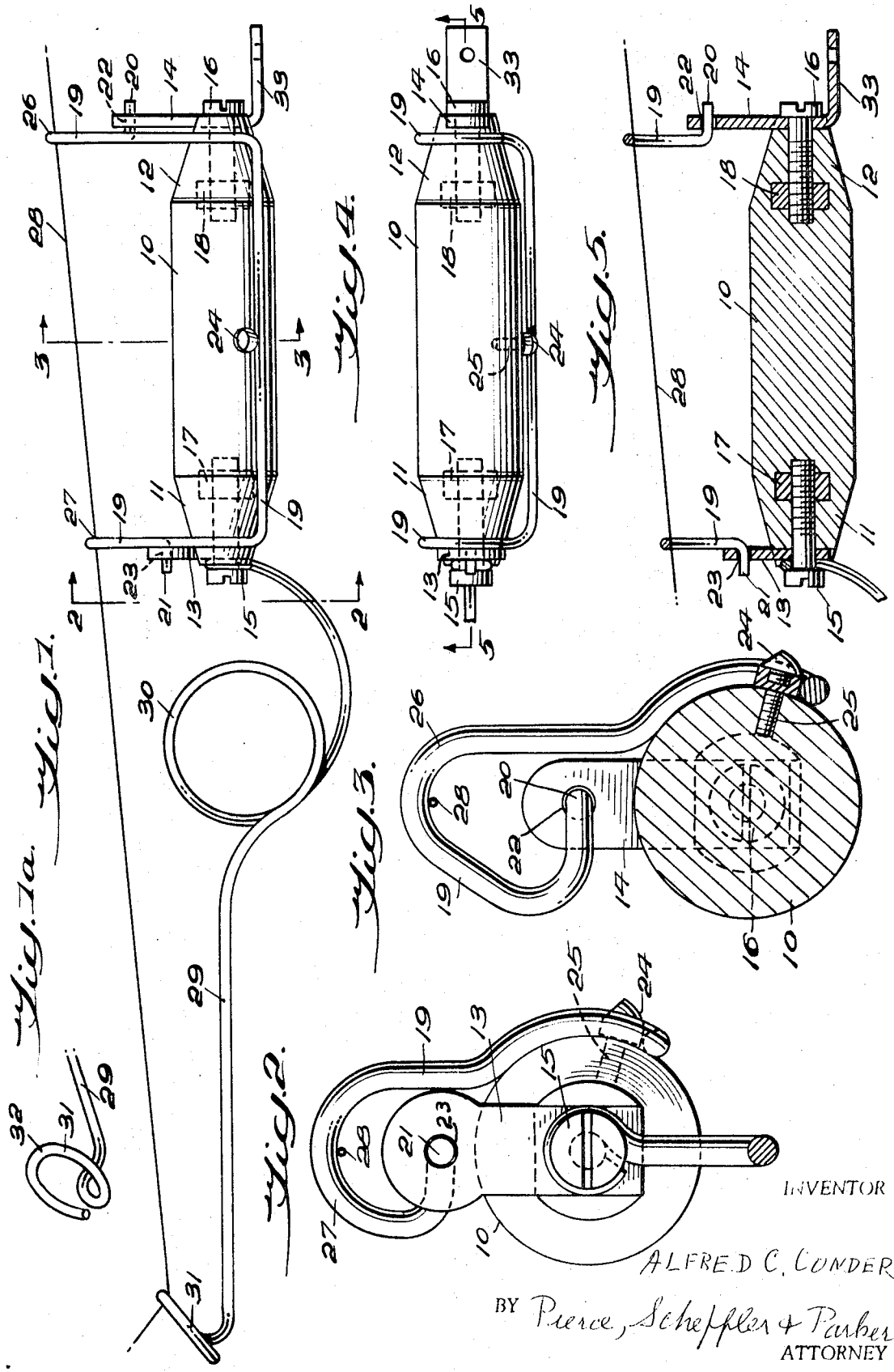

3,570,163
FISHING LINE RETRIEVER
Alfred C. Conder, 2100 Toll Gate Road,
Huntsville, Ala. 35801
Filed May 7, 1969, Ser. No. 822,397
Int. Cl. A01k 97/00
U.S. Cl. 43—17.2                               8 Claims

ABSTRACT OF THE DISCLOSURE

A weighted body member is provided at each end thereof with a pivotally mounted loop. A spring arm projects forwardly from the leading edge of the body and terminates in a looped striking head disposed at an acute angle. A fishing line is received by the loops for guiding the striking head to a snagged fishing article.

According to the present invention fishermen may easily retrieve lines and lures which have become snagged on underwater obstacles. Usually it has been necessary to permit sufficient slack in the line so that the snagged hook or lure will fall free of the obstacle thus permitting the line and hook to be retrieved. Many times, however, the hook will become embedded in or enmeshed in the obstacle, such as underwater vegetable growth or water soaked logs and the like, so that a slack line is not sufficient to release the hook from the obstacle.

My invention consists of a device which can be easily placed on or in engagement with the fishing line by the fisherman and lowered along the line to the point where the snag has occurred. The device is so designed as to wedge itself between the obstacle and the hook and release the hook from the obstacle.

These and other advantages will be apparent from the detailed description of the invention which follows and in which reference is made to the accompanying drawings in which like reference numerals refer to like parts.

In the drawings:

FIG. 1 is a side elevational view of a retriever device according to the present invention, FIG. 1a is a perspective view of a portion of FIG. 1;

FIG. 2 is an elevational view taken on line 2—2 of FIG. 1;

FIG. 3 is a cross-sectional view taken on line 3—3 of FIG. 1;

FIG. 4 is a top plan view of a portion of the device shown in FIG. 1 and,

FIG. 5 is a cross-section of a portion of the device as shown in FIG. 1.

In the drawings the retriever device includes an elongated body member 10 preferably of metal having a generally cylindrical shape although other shapes may be employed, if desired. The principal requirement of the body 10 is that it be sufficiently heavy to slide down a fishing line under water. As shown, the ends 11 and 12 of the body 10 are generally tapered or conical. At the ends 11 and 12 there are provided supports 13 and 14 which are secured to the body in any desired manner, such as by cap screws 15 and 16 which may be threaded directly into the body or, as shown, into nuts 17 and 18 which are embedded in the body 10.

A resilient spring clip member 19 is mounted on the device so that the ends 20 and 21 may be seated in bearing holes 22 and 23 provided in the supports 13 and 14. The central portion of the clip 19 engages a retainer 24 which is shown as a screw 25 having a resilient insert in the head formed of Teflon or other resilient material so that when the spring member 19 is pivoted in holes 22 and 23 the central part will engage and be releasably retained in position by the retainer 24 as shown in the figures. The member 19 when disengaged from retainer 24 enables one to place the retriever device on a fishing line so that the upper loops 26 and 27 engage the fishing line 28 as best shown in FIG. 1. The member 19 is then turned to the position shown for example in FIG. 1 and snapped into engagement with the retainer 24.

The forward end of the device is provided with a resilient spring element 29 which is secured to the body 10 by the cap screw 15 and is preferably provided with a spring coil 30 to improve the resilience and reflex action of element 29 and a striking head 31 as is shown in perspective in FIG. 1a. The striking head 31 is coiled in the manner shown to permit one to easily pass the fishing line into the upper portion 32 of the head 31. As shown the head 31 is formed at an acute angle with respect to the element 29 and lies in a transverse plane which intersects both a horizontal plane and a vertical plane through the device.

The position of the head 31 is such that when a fishing line 28 is inserted to extend thru the upper portion 32, the line 28 will follow a substantially straight line from the head 31 through the upper loop 27 to the upper loop 26 of member 19 and the line 28 will converge on the head 31 (see FIG. 1) thus assuring that the head 31 will be in close proximity to the snagged hook when it reaches the end of the line.

When the device is to be used, a control line is attached to the extension 33 of support 14 having a hole for that purpose.

When a fishing line becomes snagged on an underwater obstacle, one may position the device on the line as described above by inserting the line into the head 31 and into upper loops 26 and 27 so that the device is mounted as shown in FIG. 1. It will be noted from FIGS. 2 and 3 that the depending portions of loops 26 and 27 lie close to the edges of supports 13 and 14 so as to effectively prevent the line from passing therebetween when the clip member 19 is locked in place by retainer 24. Then, by feeding out the control line (not shown) the device, due to its weight, will slide down the snagged line. In practically every instance the fishing hook is caught on an obstacle below it, such as a water soaked branch or log or other object resting on the bottom of the body of water. When the device reaches the point of snag the angled head wedges itself between the obstacle and the hook or lure if one was used and forces the separation of the hook from the obstacle thus enabling the fisherman to easily retrieve the fishing line with the attached hook and lure. When the snag is caused by a hook being partially embedded in the obstacle it is sometimes necessary to pull or jerk the control line a few times so as to permit the retriever device to strike the obstacle several times to free the hook and thus enable the fishing line, hook and lure to be retreived.

While the device has been described with reference to the form shown in the drawings it will be understood that the shape and size of the various elements may be altered without departing from the spirit of the invention, provided of course the device is suspended on the fishing line at three well spaced points and the striking head is angled resiliently for the purposes described herein.

I claim:

1. A device for retrieving fishing lines comprising a weighted elongated body member, means pivotally mounted thereon for releasably supporting said body member at two spaced points along a fishing line, resilient means extending forwardly from the forward end of said body member, a striking head at the forward end of said resilient means and disposed at an acute vertical angle to the direction of the fishing line, said striking head adapted to be supported by the fishing line at a third point spaced forwardly of said body member whereby the proper angular position of said striking head relative to the fishing line is maintained, said striking head lying in a plane transversely of a vertical plane passing thru the fishing line and at an angle to the vertical, the lower portion of said striking head extending forwardly of the upper portion, and means for lowering said device and for retracting same along said fishing line.

2. A device as claimed in claim 1 and further comprising means for releasably locking the pivotally mounted means to the body member.

3. A device as claimed in claim 2 wherein said locking means comprises a Teflon headed retainer screw disposed in said body member whereby said pivotally mounted means may be releasably engaged with said Teflon headed retainer screw to prevent accidental disengagement of the fishing line from said device.

4. A device as claimed in claim 1 wherein the striking head comprises a coiled portion of the outer end of said resilient means.

5. A device as claimed in claim 1 wherein a line connecting the three spaced points at which the device is supported by the fishing line is a substantially straight line and converges toward the striking head.

6. A device as claimed in claim 1 wherein the pivotally mounted means for supporting the body member on the fishing line comprises a resilient spring member.

7. A device as claimed in claim 6 and further comprising means secured to the ends of said elongated body member for pivotally supporting said resilient spring member.

8. A device as claimed in claim 7 and further comprising means for securing the means for pivotally supporting said resilient spring member to the forward end of said body member and for securing said forwardly extending resilient member to said body member.

References Cited
UNITED STATES PATENTS

| | | | |
|---|---|---|---|
| 2,562,413 | 7/1951 | Carr | 43—17.2 |
| 2,609,632 | 9/1952 | Davis | 43—17.2 |
| 2,800,738 | 7/1957 | Allman | 43—17.2 |
| 3,183,619 | 5/1965 | Walden | 43—17.2 |

WARNER H. CAMP, Primary Examiner